United States Patent [19]

Long et al.

[11] Patent Number: 5,319,949
[45] Date of Patent: Jun. 14, 1994

[54] REGULATOR VALVE ASSEMBLY FOR A TORQUE CONVERTER

[75] Inventors: Charles F. Long, Pittsboro; Dennis M. Cooke, Danville; Phillip F. McCauley, Zionsville, all of Ind.

[73] Assignee: General Motors Corporation, Detroit, Mich.

[21] Appl. No.: 902,153

[22] Filed: Jun. 22, 1992

[51] Int. Cl.5 .................. F16D 33/02; F16D 33/06
[52] U.S. Cl. ............................. 60/347; 60/260; 91/444
[58] Field of Search ............... 60/330, 337, 347, 348, 60/357, 358, 359, 360; 91/444

[56] References Cited

U.S. PATENT DOCUMENTS

| | | | |
|---|---|---|---|
| 3,053,051 | 9/1962 | Kelley | 60/359 |
| 3,347,042 | 10/1967 | Horsch | 60/358 |
| 3,478,621 | 11/1969 | Johnson et al. | 60/360 |
| 3,748,856 | 7/1973 | Uozumi et al. | 60/357 |
| 3,774,400 | 11/1973 | Edmunds | 60/360 X |
| 3,977,502 | 8/1976 | Chana | 60/359 X |
| 4,881,625 | 11/1989 | Redelman | 60/337 X |

Primary Examiner—Edward K. Look
Assistant Examiner—Hoang Nguyen
Attorney, Agent, or Firm—Donald F. Scherer

[57] ABSTRACT

A regulator valve assembly adapted to be used in conjunction with a torque converter in a vehicular transmission having a pressurized hydraulic distribution system, a cooling system and a torque converter. The regulator valve assembly has a stepped valve chamber to receive a spool valve member for axial translation. The spool valve member defines first, second, third and fourth subchambers within the stepped valve chamber. Axial translation of the valve member effects selective communication between the subchambers. A first land on the spool valve member is interposed between the first and second subchambers. A second land is interposed between the second and third subchambers. A third land is interposed between the third and fourth subchambers, and a fourth land is exposed to the fourth subchamber. A first outlet communicates with the first subchamber. A first inlet and a second outlet communicate with the second subchamber. A second inlet and third outlet communicate with the third subchamber. A third inlet port communicates with the fourth subchamber. The first land exposes a projected area to the second subchamber that is less than the projected area that the second land exposes to the second subchamber. Translation of the spool valve member controls communication between the second and third subchambers as well as between the second and third subchambers. A spring biases the spool valve member in a direction to preclude communication between the first and second subchambers.

14 Claims, 6 Drawing Sheets

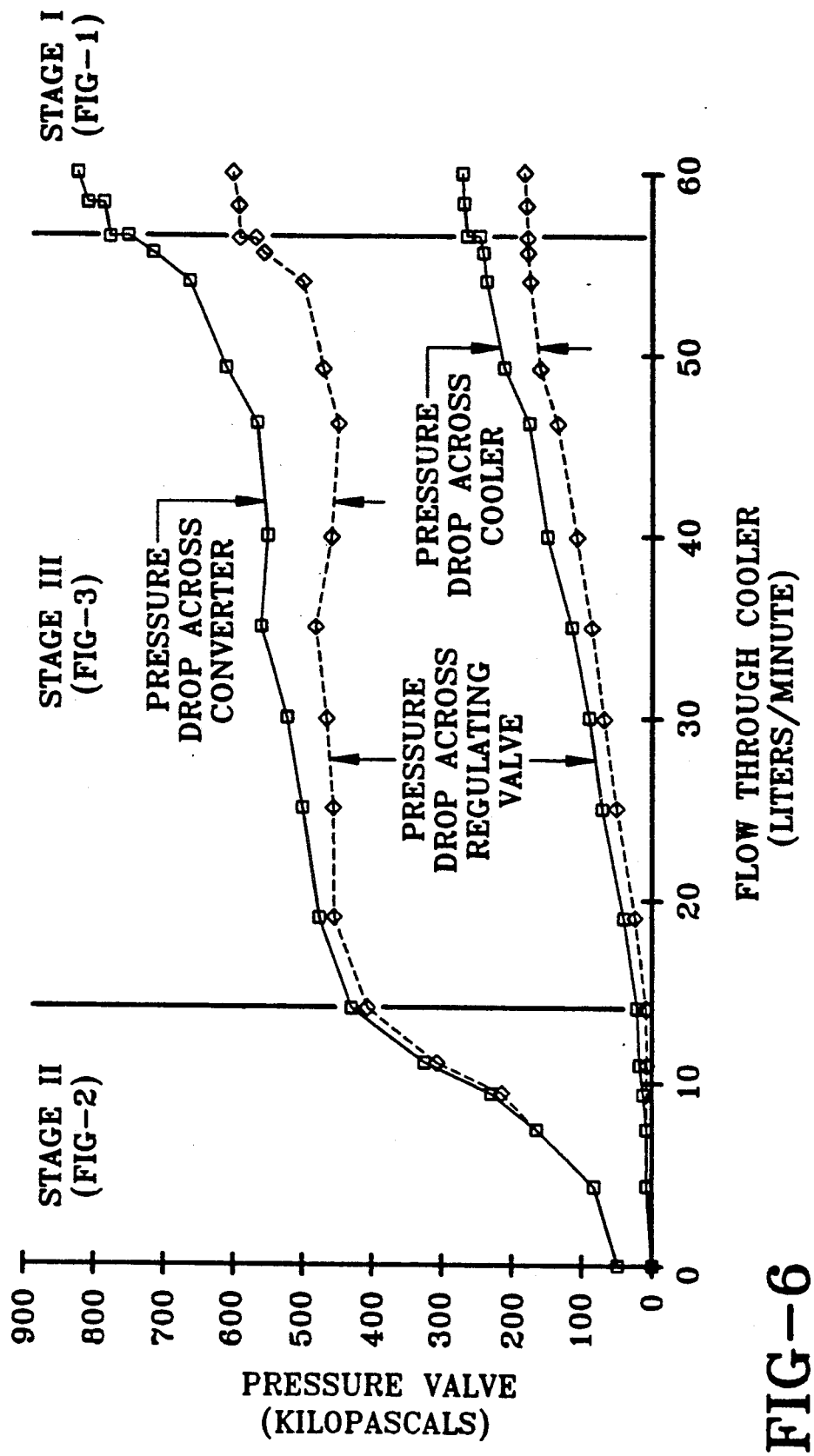

REGULATOR VALVE ASSEMBLY FOR A TORQUE CONVERTER

TECHNICAL FIELD

The present invention relates generally to an improved mechanism by which to control a fluid coupling device. More particularly, the present invention relates to an improvement for controlling fluid coupling devices in the nature of torque converters. Specifically, the present invention relates to an improved regulator valve assembly by which to control the flow of hydraulic fluid to and from vehicular torque converters.

BACKGROUND OF THE INVENTION

Fluid couplers in the nature of torque converters are widely employed in vehicles to transfer torque between the engine and the transmission. In additional to this fundamental purpose, torque converters serve two other primary functions. First, they provide a means by which to effect a smooth coupling between the engine and the transmission. Second, they provide hydraulic torque multiplication when additional performance is desired.

The typical torque converter being utilized in vehicular drive trains normally has three major components—vis.: a centrifugal pump or torque input member (commonly designated as the impeller); the driven or torque output member (commonly designated as the turbine); and, a reaction member (commonly designated as the stator) that is interposed between the impeller and the turbine to effect a more favorable direction for the flow of hydraulic fluid exiting the turbine and returning to the impeller.

The vanes of the impeller are generally secured to the cover of the torque converter. Inclusion of the cover as a component of the impeller assembly has simplified sealing the torque converter so that the impeller assembly may be contained within a housing that is filled with hydraulic fluid. Although hydraulic fluid is supplied to the torque converter under pressure by a pump and torque converter valve arrangement, dynamic circulation of the hydraulic fluid through the torque converter is effected by rotation of the cover to which the impeller vanes are affixed, and the dynamically circulating hydraulic fluid impinges against the opposed vanes of the turbine to effect rotation of the turbine in response to rotation of the impeller. The torque converter is thus a closed system with the impeller operatively connected to a source of input torque and with the turbine member operatively connected to deliver the output torque, as required.

Typically, the cover and the vane elements of the impeller that are attached thereto—the combination of which constitutes the impeller assembly—are affixed to a flex plate that is bolted to the crankshaft of the engine. The turbine, on the other hand, is connected to an output shaft which exits the torque converter to serve as the input shaft of the vehicle transmission.

Because of the aforesaid fixed mechanical connection between the engine and the impeller, the impeller will rotate at engine speed whenever the engine is operating. It is this rotation of the impeller which causes it to operate as a pump, and particularly a centrifugal pump. That is, the impeller ingests pressurized hydraulic fluid present at the central or hub portion thereof and discharges hydraulic fluid axially into the turbine at the radially outer rim of the impeller assembly. Although the axial component of the hydraulic fluid discharging from the impeller moves the hydraulic fluid axially into the turbine, rotation of the impeller also imparts a circumferential or centrifugal component to the hydraulic fluid as it exits the impeller. As the hydraulic fluid exiting the impeller engages the turbine, the kinetic energy of the moving hydraulic fluid urges the turbine to rotate in response to rotation of the impeller.

When the vehicle is not moving, and even though the engine is idling, the impeller is not spinning at a sufficient angular velocity to supply the energy necessary to overcome the static inertia of the vehicle. In that situation, therefore, the hydraulic fluid simply flows through the turbine, and ideally the turbine does not rotate. This allows the vehicle to remain at rest, even though the transmission has been shifted into a selected drive range and the engine is running.

As the throttle is opened, however, the rotational speed of the engine, and therefore the impeller, increases. At some rotational speed of the engine, sufficient energy is being imparted to the turbine so that it will be able to overcome the static inertia that theretofore prevented the vehicle from moving. At that time, the energy transferred from the impeller to the turbine will be delivered to the drive wheels through the transmission.

Kinetic energy is most effectively imparted to the turbine when the hydraulic fluid circulating within the torque converter follows the contours of the turbine blades and the shell from which they are presented, and then leaves the turbine. The most effective configuration for the contoured surfaces of the impeller vanes have evolved over years of testing and experience. Perhaps, the most effective vanes are the bulbous-nosed curvilinear vanes having a hydrofoil configuration, but the cost to fabricate this efficient contour is comparatively high. In any event, the configuration of the turbine causes the fluid passing therethrough to exit in a direction that is generally inappropriate to that direction at which one would prefer to have the hydraulic fluid re-enter the impeller. Accordingly, were the fluid to re-enter the impeller in that direction, the fluid would strike the vanes of the impeller in a direction that would be detrimental to the rotation of the impeller.

In order to minimize the problems resulting from the undesirable direction at which the fluid would enter the impeller as it exits the turbine without any redirection, a stator is generally interposed within the path which the hydraulic fluid must traverse between its exit from the turbine and its re-entry into the impeller. In fact, the stator redirects the hydraulic fluid which has exited the turbine so that the fluid will enter the input of the impeller in a direction that will cause the fluid to assist the engine in turning the impeller. The force which the hydraulic fluid thus imparts to the impeller comprises one source for additional kinetic energy being applied to the turbine. It is this additional energy applied to the impeller which results in an increase in the force applied to drive the turbine—thereby accomplishing torque multiplication.

In order to obviate the costs of casting, machining and finishing vanes having sophisticated contours, non-contoured blades are being substituted for the contoured vanes, and the blades are, for the most part, being stamped from sheet metal and then secured to the shell of the impeller. However, as might be expected, such sheet metal blades provide lower efficiency than the more expensive contoured vanes. This result is particularly apparent during those conditions of operation at which the pressure of the hydraulic fluid within the torque converter falls within the lower portion of the acceptable operating range.

In order to achieve utmost economy, torque converters are often provided with a clutch arrangement that effectively locks the impeller and the turbine into a unitary rotating mass when "slip" between the impeller and the turbine is no longer required for smooth coupling. Typically, the torque converter clutch is activated to effect unitary rotation in response to reduced hydraulic pressure within the torque converter. Thus, should the lowered pressure be the result of the reduced efficiency resulting from the use of a noncontoured impeller and/or turbine blades rather than the result of the impeller and the turbine operating at near unitary rotational speeds, the torque converter clutch could inadvertently activate before such activation was desired.

It must be appreciated that torque converters are not closed systems. In practice, torque converters require a source of clean pressurized hydraulic fluid. A pump draws hydraulic fluid from the transmission pan or from a sump, and delivers hydraulic fluid at a predetermined pressure. A torque converter control valve has been traditionally employed to maintain the preselected pressure of the hydraulic fluid supplied by the pump. The pressurized hydraulic fluid is supplied to the converter, where the hydraulic fluid is used to effect a hydraulic torque transfer between the impeller and the turbine within the torque converter. Thereafter, the fluid is directed through a cooling system to the pump inlet and then recycled. The pump which delivers the pressurized hydraulic fluid is normally driven by the engine of the vehicle. As such, pressures at the outlet of the pump will normally vary, at least to some degree, in response to engine speed.

Torque converter control valves are usually spring balanced and are opened to permit flow to the torque converter only after the pressure at the outlet of the pump reaches some predetermined value. Thus, it is only after the pressure of the hydraulic fluid at the outlet of the pump attains the desired magnitude that the torque converter control valve will open to permit the flow of pressurized fluid to the torque converter. As the pressure continues to increase, the torque converter valve directs excess fluid to the inlet side of the pump.

Such arrangements have worked quite well in the past, and continue to work well for torque converters having sophisticated impeller vanes. However, when one substitutes noncontoured blades for the contoured vanes of an impeller, it has been found that the historic torque converter control valves are unable to maintain the hydraulic fluid within the torque converter at the pressures necessary to accommodate the efficiency differential between impeller vanes and impeller blades.

In addition, those torque converters which incorporate clutches that interact between the impeller and the turbine generally require that some minimum pressure be maintained within the torque converter.

SUMMARY OF THE INVENTION

It is therefore a primary object of the present invention to provide a regulator valve assembly for controlling the pressure of the hydraulic fluid within the torque converter.

It is another object of the the present invention to provide a regulator valve assembly, as above, that controls the pressure continuously supplied to the torque converter control valve through the sequential operating stages of the torque converter.

It is a further object of the present invention to provide a regulator valve assembly, as above, that will improve the efficiency of torque converters employing noncontoured metal blades rather than contoured vanes.

It is still another object of the present invention to provide a regulator valve assembly, as above, that will preclude premature activation and/or deactivation of the torque converter clutch.

It is yet another object of the present invention to provide a composite system which employs a regulator valve assembly, as above, a torque converter control valve, a torque converter and a control assembly that can be adapted to respond to signals from a conventional electronic processing unit so as to respond to the actuation status of the brakes, the throttle setting, engine speed, vehicle speed and the transmission gear ratio at which the vehicle is operating.

These and other objects of the invention, as well as the advantages thereof over existing and prior art forms, which will be apparent in view of the following detailed specification, are accomplished by means hereinafter described and claimed.

In general, a regulator valve assembly embodying the concepts of the present invention is adapted to be used in conjunction with a torque converter in a vehicular transmission. Typically, the transmission has a hydraulic system including a pump for supplying pressurized hydraulic fluid to a distribution system within the transmission. The transmission also has a cooling system and a torque converter.

The regulator valve assembly includes a housing, and a stepped valve chamber is provided within the housing. A first inlet port communicates with the valve chamber through the housing and is adapted to receive the pressurized fluid from the transmission hydraulic system. A first outlet port also communicates with the valve chamber through the housing, and that fist outlet port is adapted to communicate with the intake of a pump means included in the transmission control assembly which provides pressurized hydraulic fluid to the transmission hydraulic control system. A second outlet port communicates with the valve chamber through the housing and is adapted for communicating with the inlet of the torque converter. A third outlet port communicates with the valve chamber through the housing and is adapted for communicating with the inlet of a transmission cooling means.

A spool valve member, which comports with the stepped valve chamber, is axially translatable within the stepped chamber to effect selective communication between the aforesaid ports.

Lands on the spool valve member define first, second, third and fourth subchambers within the stepped valve chamber. A first land on the spool valve member is interposed between the first and second subchambers. A third land is interposed between the third and fourth subchambers, and a fourth land is exposed to the fourth subchamber.

The first outlet communicates with the first subchamber. The first inlet and the second outlet communicate with the second subchamber. The third outlet communicates with the third subchamber, and a third inlet port communicates with the fourth subchamber.

The aforesaid axial translation of the valve member effects selective communication between the subchambers. Specifically, selective translation of the spool valve member effects communication between the second and third subchambers. Further translation of the spool valve member effects communication between the first and second subchambers, as well as between the second and third subchambers. It must be appreciated that the first land exposes a projected area to the second subchamber that is less than the projected area which the second land exposes to the second subchamber. That preselected differential between the projected areas of the first and second lands permits the spool valve member to translate in response to the pressure of the hydraulic fluid within the second subchamber. In addition, a spring is provided to bias the spool valve member against the differential forces applied to the first and second lands as a result of the differential projected areas projected by those lands. As such, when the biasing action of the spring exceeds those differential forces, communication is precluded between the first and second subchambers.

Pressurized hydraulic fluid is selectively supplied to the fourth subchamber through the third inlet port.

One preferred embodiment of a regulator valve assembly embodying the concepts of the present invention is deemed sufficient to effect a full disclosure of the subject invention. The exemplary regulator valve assembly is described in detail without attempting to show all of the various forms and modifications in which the invention might be embodied; the invention being measured by the appended claims and not by the details of the specification.

BRIEF DESCRIPTION OF THE DRAWINGS

FIG. 6 is a graphic representation of the pressure versus flow achieved by a regulator valve assembly embodying the concepts of the present invention.

DESCRIPTION OF AN EXEMPLARY EMBODIMENT

Figure 1:
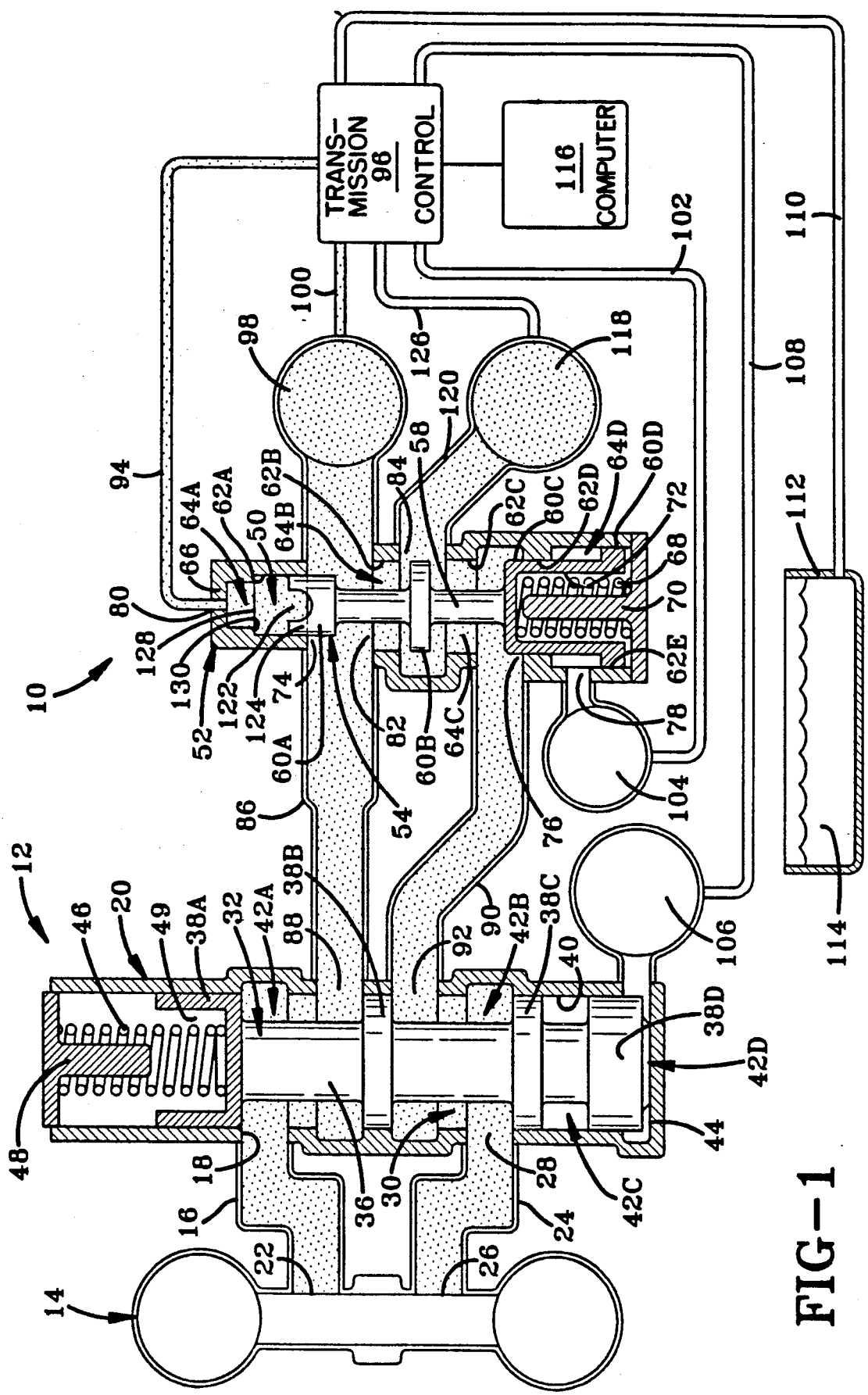
FIG. 1 is a schematic diagram of a vehicular torque converter, a torque converter control valve, an improved regulator valve assembly embodying the concepts of the present invention, a control assembly and the connecting conduits by which to effect the improved operation of the torque converter associated with the use of the regulator valve assembly that reacts to the signals generated by an electronic processing unit in response to the operating parameters of the vehicle, the diagram depicting pressurized fluid flow at "Stage I" operation of the torque converter.

One representative form of a regulator valve assembly embodying the concepts of the present invention is designated generally by the numeral 10 on the accompanying drawings. The representative regulator valve assembly 10 operatively communicates with a widely employed torque converter control valve 12 through which the recirculating hydraulic fluid is directed to and returned from a torque converter 14—the application of pressurized hydraulic fluid being depicted as a stippled field.

With reference to the drawings, it will be observed that a first fluid conduit 16 communicates between the first outlet port 18 in housing 20 of the torque converter control valve 12 and the inlet port 22 of the torque converter 14. A second conduit 24 communicates between the outlet port 26 of the torque converter 14 and the first inlet port 28 in the housing 20 of the torque converter control valve 12.

The internal configuration of the torque converter 14 is quite well known to the art and need not therefore be described herein. The torque converter 14 cooperatively interacts with a regulator valve assembly 10, as will be hereinafter more fully described.

Similarly, the internal configuration of the torque converter control valve 12 is also quite well known to the art, but those portions of the torque converter control valve which interact directly between the regulator valve assembly 10 and the torque converter 14 will be briefly described in order to facilitate a description as to the interrelated construction and operation of the regulator valve assembly 10.

As such, the converter control valve 12 has a substantially cylindrical valve chamber 30 within the housing 20. A spool valve member 32 is received within the valve chamber 30 for axial translation in order to effect selective communication between the ports which open through the housing 20 into the valve chamber 30 at axially spaced locations along the spool valve chamber 30.

The spool valve member 32 has a central shaft portion 36 with a plurality of lands 38 that extend radially outwardly from the central shaft portion 36 at axially spaced locations along the spool valve member 32. As shown, the spool valve member 32 typically employs four lands 38A, 38B, 38C and 38D. When the lands 38 cooperatively engage the cylindrical wall 40 of the spool valve chamber 30, that cooperative engagement defines a plurality of subchambers 42 within valve chamber 30. Communication between appropriately located ports is effected by those subchambers 42 in response to the axial disposition of the spool valve member 32.

As previewed in the preceding paragraph, and as will appear in the detailed description which follows, a particular structural member, component or arrangement may be employed at more than one location. When referring generally to that type of structural member, component or arrangement, a common numerical designation shall be employed. However, when one of the structural members, components or arrangements so designated is to be individually identified, it shall be referenced by virtue of a letter suffix employed in combination with the numerical designation employed for general identification of that structural member, component or arrangement. Thus, there are four lands on spool valve member 32, and those lands are generally identified by the numeral 38, but the specific individual lands are therefore identified as 38A, 38B, 38C and 38D in the specification and on the drawings. This same suffix convention shall be employed throughout the specification.

Returning to the description of one preferred embodiment, as shown in the drawings, the lands 38A and 38B delineate subchamber 42A; lands 38B and 38C delineate subchamber 42B; lands 38C and 38D delineate subchamber 42C; and land 38D, in conjunction with the end wall 44 of housing 20, delineates subchamber 42D. The spool valve member 32 in a converter control valve 12 is normally, as depicted in the drawings, spring biased. That is, a compression spring 46 interacts between a post plug 48 that forms the upper wall of the housing 20 and a cup-shaped receiver 49 in land 38A. As such, spring 46 biases the valve member 32 downwardly, as viewed in the drawings.

The torque converter 14 communicates with the converter control valve 12 by virtue of the first and second conduits 16 and 24, as previously noted. The regulator valve assembly 10 also communicates with the torque converter control valve 12, but before discussing the details of that communication, even in a rudimentary fashion, the preferred configuration of an exemplary structure for a regulator valve assembly 10 will be described.

Specifically, the regulator valve assembly 10 is, in general, a modified spool valve, and as such, a cylindrically-stepped valve chamber 50 is provided within the housing 52 of the regulator valve assembly 10. A spool valve member 54 is received within the stepped valve chamber 50 for axial translation in order to effect selective communication between the ports which open through the housing 52 into the valve chamber 50 at axially spaced locations along the spool valve chamber 50.

The spool valve member 54 has a central shaft portion 58 with a plurality of lands 60 that extend radially outwardly from the central shaft portion 58 at axially spaced locations along the spool valve member 54. As shown, the spool valve member 54 preferably has two individual lands 60A and 60B, as well as two conjoined compound lands 60C and 60D. As will be explained in greater detail, the lands 60 do not all have the same diameter. Rather, each land has a diameter which permits it cooperatively to slide only along that portion of the interior wall 62 which it engages, as the spool member 54 is axially translated within the chamber 50 of the regulator valve assembly 10. When the lands 60 cooperatively engage the interior wall portions 62 of the valve chamber 50, the lands 60 serve to define a plurality of subchambers 64 within valve chamber 50. Communication between appropriately located ports is effected through the subchambers 64 in response to the axial disposition of the spool valve member 54.

The land 60A cooperates with the opposed end wall 66 of the regulator valve housing 52 to delineate subchamber 64A; lands 60A and 60B delineate subchamber 64B; land 60B and land 60C delineate subchamber 64C; and lands 60C and 60D delineate subchamber 64D.

For reasons that will be hereinafter more fully explained in conjunction with the operation of the regulator valve assembly 10, the diameter of the land 60A, and thus the diameter of the cylindrical wall portion 62A which circumscribes the subchamber 64A within which the land 60A is operatively received, is of lesser diameter than at least land 60B and the cylindrical wall portion 62B associated with subchamber 64B within which the land 60B is operatively received.

The diameter of lands 60B and 60C are preferably equal inasmuch as there is no operational need for those lands to project different surface areas. As such, the diameter of wall portions 62C and 62D may be the same as the diameter of wall portion 62B. In addition, construction of the regulator valve assembly 10 is facilitated by having those lands of equal diameter. On the other hand, land 60D is of greater diameter than land 60C. Thus, wall portion 62E, which delineates subchamber 64, is therefore of greater diameter than wall portion 62D.

The spool valve member 54 in the regulator valve assembly 10 is also spring biased. As depicted, a compression spring 68 acts between a post plug 70 that forms the lowermost wall of the housing 52 when oriented, as depicted in the drawings, and a cup-shaped receiver 72 presented within the composite land 60C and 60D to bias the spool valve member 54 upwardly, in the orientation depicted.

The regulator valve assembly 10 has first, second and third inlet ports 74, 76 and 78, respectively, which communicate with the stepped spool chamber 50. The regulator valve assembly 10 also has first, second and third outlet ports 80, 82 and 84, respectively, which also communicate with the chamber 50. A conduit 86 communicates between a second inlet port 88 in the housing 20 of the torque converter control valve 12 and the second outlet port 82 in the housing 52 of the regulator valve assembly 10. The second inlet port 88 of the torque converter control valve 12 communicates with subchamber 42A when the valve element 32 is disposed within the valve chamber 30, as shown in FIG. 1. Conversely, the second outlet port 82 in regulator valve assembly 10 communicates with subchamber 64B when the spool valve member 54 is disposed within the valve chamber 50, as shown in FIG. 1.

A conduit 90 communicates between a second outlet port 92 in the housing 20 of the torque converter control valve 12 and the second inlet port 76 in the housing 52 in regulator valve assembly 10. The second outlet port 92 of the torque converter control valve 12 communicates with subchamber 42B when the valve element 32 is disposed within the valve chamber 30 (as shown in FIG. 1), and the second inlet port 76 of regulator valve assembly 10 communicates with subchamber 64C when the spool valve member 54 is disposed within the valve chamber 50, as shown in FIG. 1.

A conduit 94 communicates between the first outlet port 80 of the regulator control valve assembly 10 and the transmission control, schematically represented by the box 96. The transmission control 96 includes a pump, a pressure regulating device and valving which directs the pressurized hydraulic fluid —provided by the pump within the transmission control 96—to: the hydraulic fluid distribution network within the transmission so as to supply the clutch and brake pistons, the governor valve, the various sensor devices for reading the vehicle speed, throttle position and whatever other hydraulic devices are required by the transmission. After those primary hydraulic fluid usages are satisfied, the pressurized hydraulic fluid "overage" is supplied to the torque converter 14. Thus, the overage is directed to a supply header 98 by a first feed conduit 100.

The overage is also directed to a pressure biasing arrangement, commonly referred to as a "converter knockdown", as by a second feed conduit 102 directing overage to a knockdown header 104 that introduces pressurized fluid into subchamber 64D. In addition, the overage is fed to a torque converter clutch biasing arrangement 106 that is operatively associated with the converter control valve 12, as by a third feed conduit 108. A supply conduit 110 communicates between the sump—represented by the reservoir container 112—to the input of the pump within the transmission control 96, in order to provide a continuous source of hydraulic fluid 114. The transmission control 96 is operated by a conventional electronic processing unit, such as a digital computer 116.

The electronic processing unit 116 processes signals reflecting the conditions of the vehicle brakes, the throttle, engine speed, vehicle speed and the transmission gear ratio selected in order to establish the shift points, pressure regulation, as well as the state of the converter clutch, and directs the output from the pump—through the pressure regulating device and the valving, all of which may be incorporated in the transmission control 96—through the appropriate feed conduit(s) emanating from the transmission control 96.

Operation

FIG. 1 represents that operating condition wherein the peak or excess flow of hydraulic fluid is supplied to the torque converter 14. This operating condition, which will be hereinafter designated as Stage I, frequently occurs when the vehicle is cold or when the engine speed is elevated. Under those conditions, the regulator valve assembly 10 is operated by the pressure of the overage hydraulic fluid supplied to subchamber 64B through the first inlet port 74 from the first feeder conduit 100 and the supply header 98. A portion of that pressurized hydraulic fluid passes into the torque converter 14 through the subchamber 42A in the torque converter control valve 12. Fluid exits from the torque converter 14 through subchamber 42B of the torque converter control valve 12 and into subchamber 64C in the regulator valve assembly 10 from which it is directed onto the cooler 118 through the conduit 120.

It must be appreciated that the fluid pressure acting against the deferential projected areas of the lands 60A and 60B will force the spool valve member 54 to compress the spring 68 so that the spool valve element will translate downwardly to at least that position represented in FIG. 1. This translation of the spool valve member 54 within the regulator valve assembly 10 in response to the pressure of the hydraulic fluid therein constitutes one phase of the regulating function provided by the improved regulator valve assembly 10.

Thus, the axial spacing of the lands 60A and 60B, taken in conjunction with the axial spacing of the wall portions 62A and 62B, assures that the land 60B will translate axially downwardly past wall portion 62B to open subchamber 64B to conduit 120 and thereby permit hydraulic fluid to exit chamber 64B past land 60B and flow through the conduit 120 into the cooler 118 in response to fluid pressure within subchamber 64B. In addition, the pressure within subchamber 64B may cause the spool valve member 52 to be displaced to a position in which the arcuate aperture 122 in the skirt portion 124 of the land 60A will allow some hydraulic fluid to flow past the land 60A into chamber 64A and return through the conduit 94 to the pump within the transmission control 96.

Figure 2:
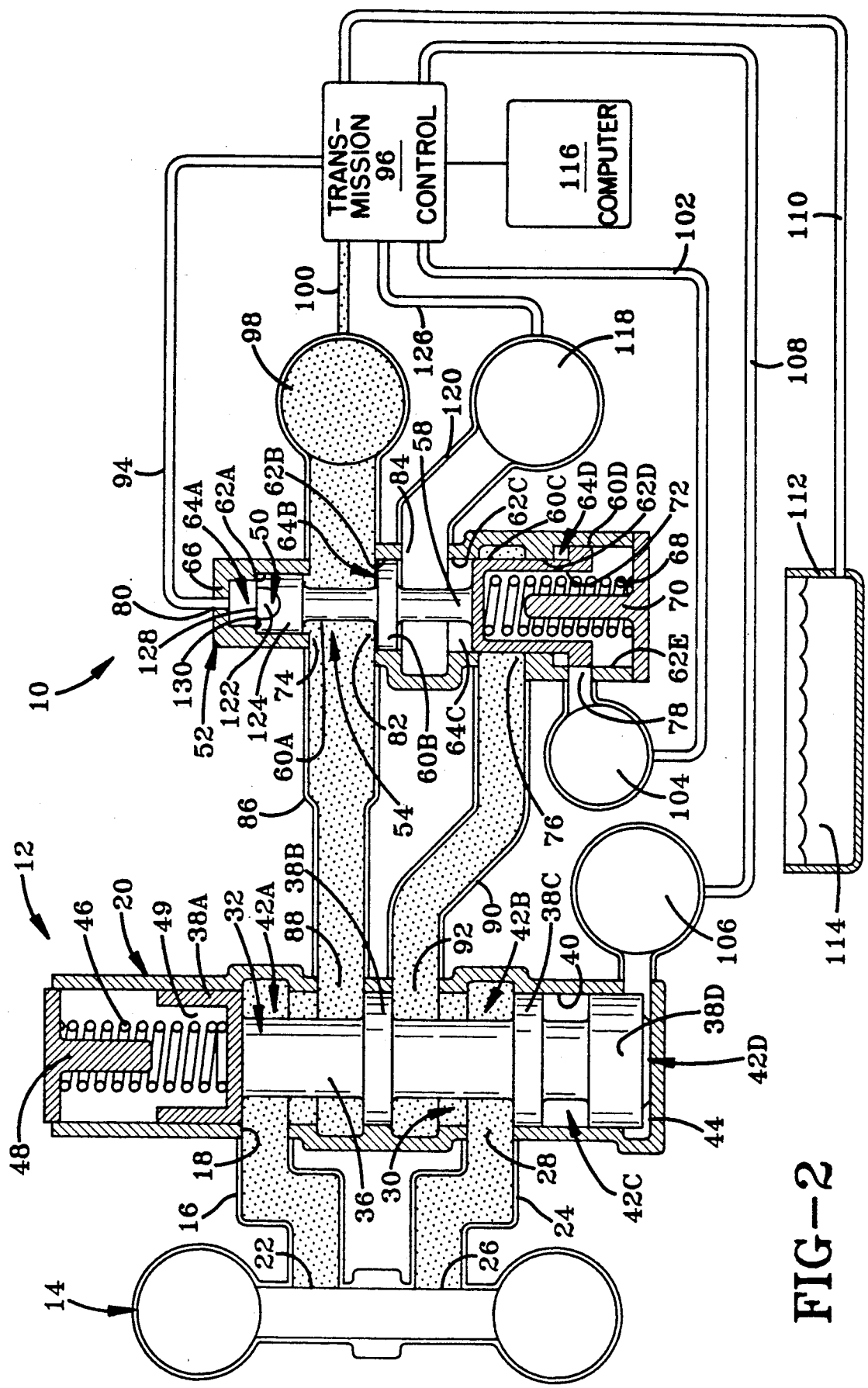
FIG. 2 is a schematic diagram similar to FIG. 1, but depicting pressurized fluid at "Stage II" operation of the torque converter.

FIG. 2 represents Stage II operation—i.e.: the condition that is occasioned when the vehicle is at low engine speeds. Torque transfer between the impeller and the turbine of the torque converter 14 is proportional to the pressure of the fluid within the converter, at least initially the maximum fluid pressure should be provided to the converter 14. To achieve that pressure, the flow of hydraulic fluid through the torque converter 14 is minimized.

Due to low engine speed, resulting in low pump flow, the differential forces acting on the lands 60A and 60B are reduced to the point that the spring 68 will effect translation of the spool valve member 54 from the position depicted in FIG. 1 to that depicted in FIG. 2. When the spring 68 can overcome the force differential acting on the spool lands 60A and 60B, the spool valve member 54 is driven upwardly to the point where the upper edge 128 of land 60A is forced against stop shoulder 130. As represented in FIG. 6, Stage II is operative when pressure at the inlet port 88 is less than 425 kilopascals (61.5 pounds per square inch).

Thus, under the initial operating conditions of Stage II, there is no provision for exiting flow of the hydraulic fluid through the regulator valve assembly 10. As the rotational speed of the engine continues to increase, the pressure of the hydraulic fluid within the converter can be regulated by translation of the valve member 54 which serves to divert that quantity of hydraulic fluid past land 60C into cooler 118, as necessary to maintain the hydraulic pressure within the desired operating range. As represented in FIG. 6, this phase of regulation is identified as operation along the abscissa in the range defined between the "Stage I" and "Stage II" designations. As shown, this range might well be preselected to fall within the following pressure parameters—viz.: pressures of from about 425 kilopascals (61.5 pounds per square inch) to about 790 kilopascals (114.5 pounds per square inch).

However, as the speed of the impeller continues to increase, the pressure of the hydraulic fluid within the converter will eventually approach a value that is higher than desirable. As that pressure value is approached, the pressure acting on the differential area of lands 60A-60B will continue to increase causing the valve spool 54 to translate further permitting the land 60B to open flow to the cooler 118 Further increases in fluid pressure in supply header 98 will result in further translation of valve spool 54 until a flow connection through the arcuate aperture 122 is established. This is the valve position shown in FIG. 3. This regulation, which is identical to the valve position described as Stage I, will continue through high speed vehicle operation, unless a torque converter clutch is actuated or the vehicle is slowed.

Figure 4:
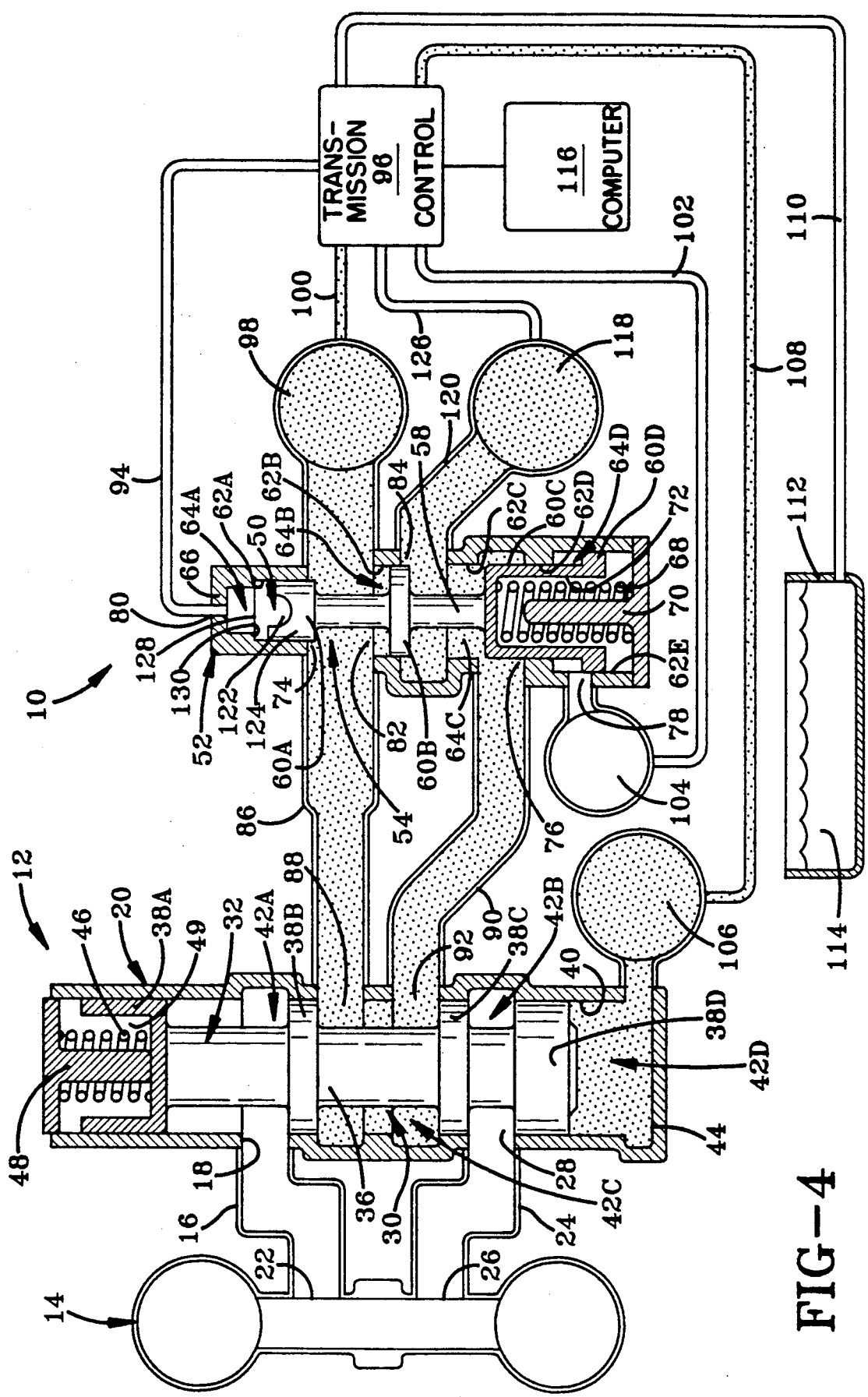
FIG. 4 is a schematic diagram similar to FIGS. 1-3, but depicting pressurized fluid flow associated with activation and deactivation of a torque converter clutch.

With reference to FIG. 4, one can observe the conditions of the regulator valve assembly 10 in conjunction with the torque converter control 12 which occur when a torque converter clutch (not shown) is actuated to assure that the impeller and the turbine rotate as a conjoined unitary element. In this condition, the pressurized hydraulic fluid must bypass the torque converter 14. For that operation, the overage fluid is supplied through feed conduit 108 to the torque converter biasing header 106 which directs the pressurized fluid conduit 108 to the torque converter biasing header 106 which directs the pressurized fluid into subchamber 42D of the torque converter control valve 12. Torque converter clutches are well known to the art, and that structure is not therefore further described. The present structure simply assures that the torque converter is not supplied with additional hydraulic fluid when the torque converter clutch is actuated mechanically to conjoin the turbine to the impeller.

Figure 3:
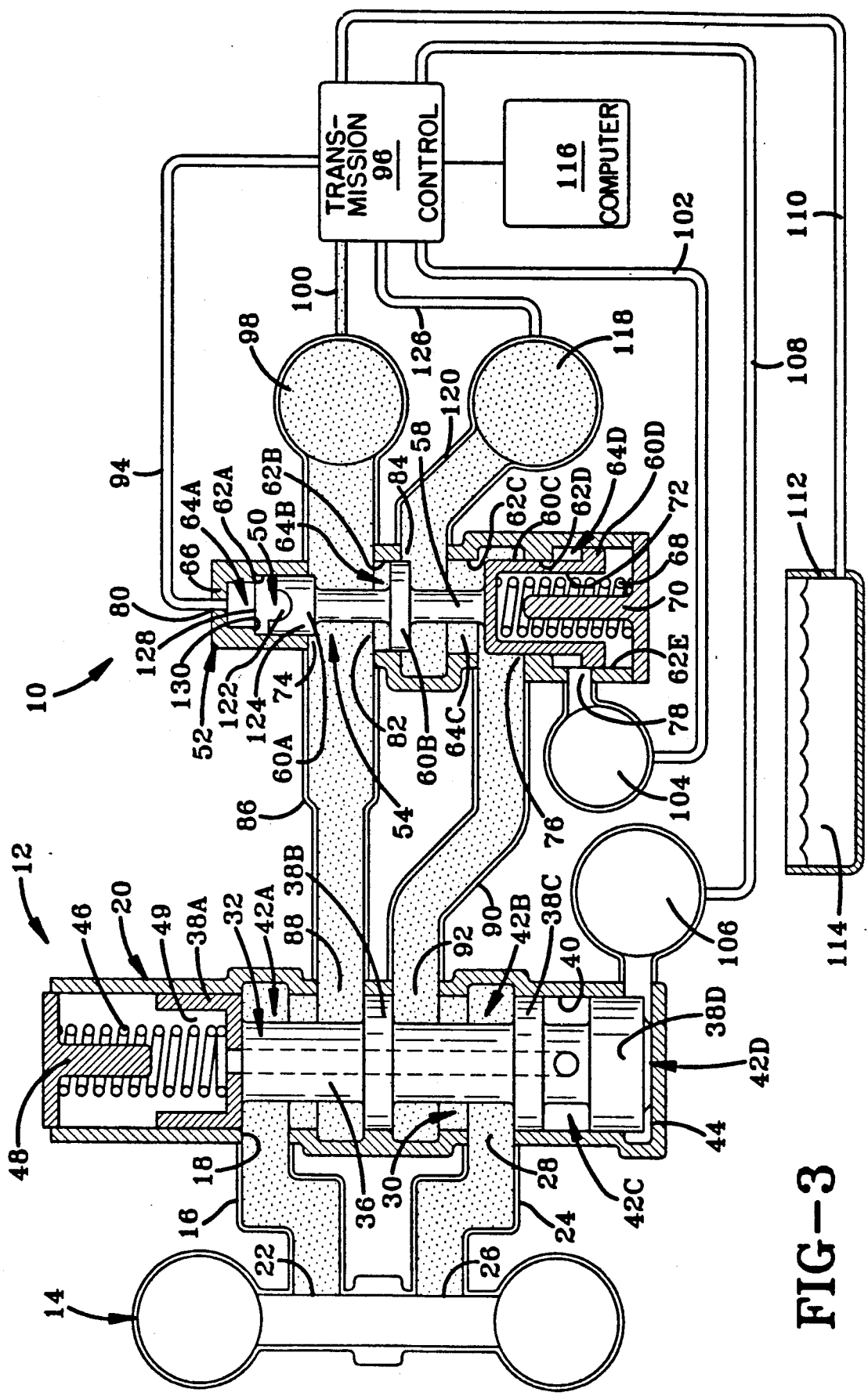
FIG. 3 is a schematic diagram similar to FIGS. 1 and 2, but depicting pressurized fluid flow at "Stage III" operation of the torque converter.

The entry of pressurized fluid into subchamber 42D drives the spool valve member 32 in the torque converter control valve 12 upwardly from the position depicted in FIGS. 1-3 to the position depicted in FIG. 4. With the spool valve member 32 so disposed, the land 38B is located in a position which forecloses communication between the second inlet port 88 and the first outlet port 18, and the land 38C is located in a position which forecloses communication between the first input port 28 and the second outlet port 92. As such, the second inlet port 88 is placed in direct communication with the second outlet port 92, and the hydraulic fluid entering the torque converter control valve 12 from the second outlet port 88 of the regulator valve assembly 10 is simply returned to the regulator valve assembly 10 through the second inlet port 76, as represented in FIG. 4.

It should be observed that when the torque converter clutch has been engaged, the regulator valve assembly 10 is capable of diverting the flow of hydraulic fluid directly from the subchamber 64B into the conduit 120 leading to the cooler 118 by virtue of the fact that the differential projected areas of lands 60A and 60B will permit the forces applied to those lands to drive the spool valve element 54 downwardly to the position depicted in FIG. 4. In addition, the pressure within subchamber 64B may cause the spool valve member 52 to be displaced to a position in which the arcuate aperture 122 in the skirt portion 124 of the land 64A will allow some hydraulic fluid to flow past the land 60A into chamber 64A and return through the conduit 94 to the pump within the transmission control 96.

It can be observed that the land 60B is displaced below wall portion 62B a greater distance than aperture 122 is displaced beneath wall portion 62A. This evidences the fact that the regulator valve assembly 10 permits initial flow to the cooler through subchamber 64C before exhausting directly to the pump in transmission control 96 through the subchamber 64A in the regulator valve assembly 10.

Figure 5:
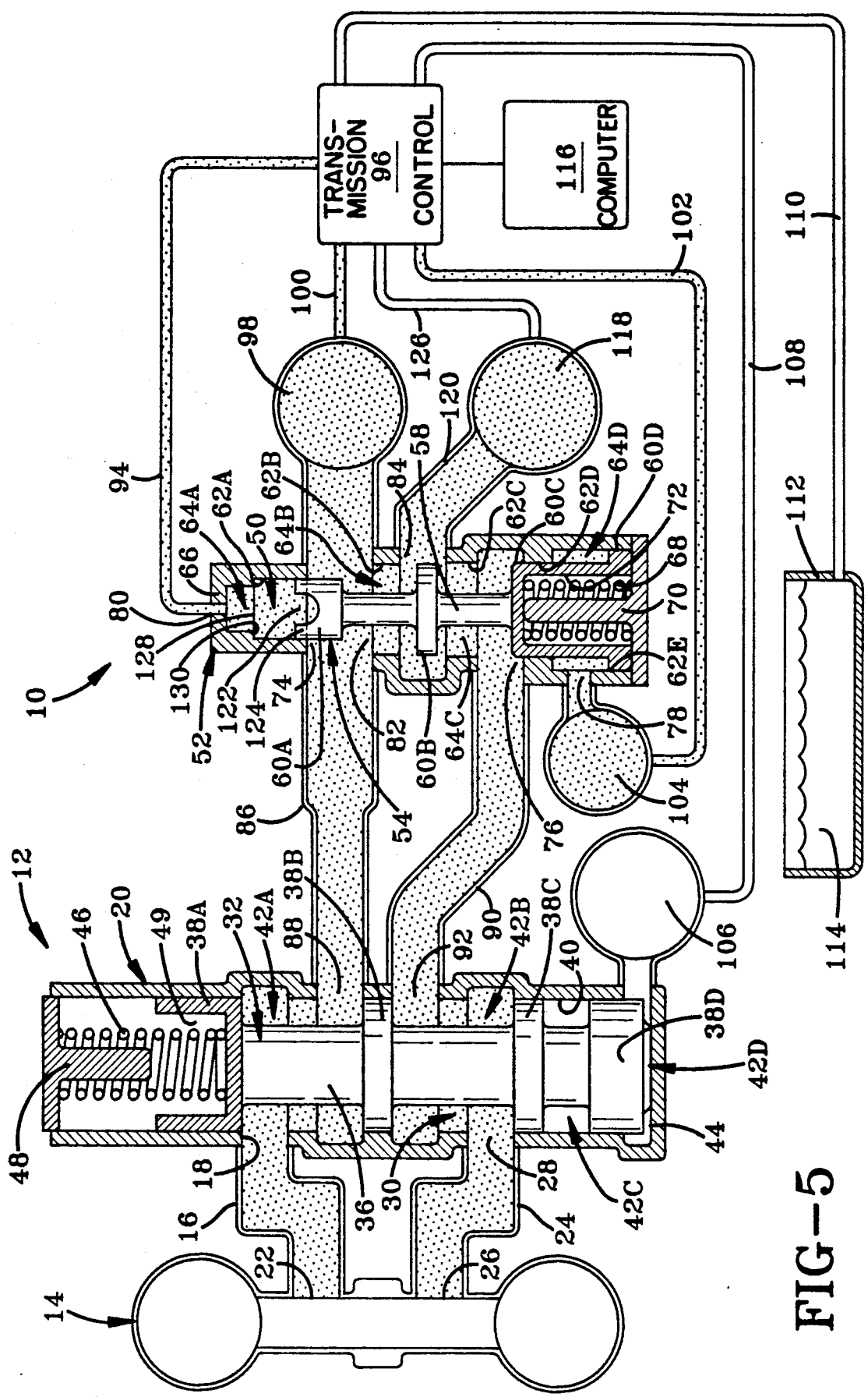
FIG. 5 is a schematic diagram similar to FIGS. 1-4, but depicting pressurized fluid flow at "Stage IV" operation of the torque converter.

The final phase of operation occurs when the operator applies the brakes. That action initiates Stage IV operation, as depicted in FIG. 5. When Stage IV is initiated, the transmission control 96 sends pressurized fluid through conduit 102 into the knockdown header 104, which feeds subchamber 64D. The presence of fluid at line pressure in subchamber 64D translates the spool valve member 54 to compress the spring 68, not only to open the passage to subchamber 64A, but also to permit the fluid to dump into the cooler 118 past the land 60B.

As such, the configurational condition of the regulator valve assembly 10 for Stage IV is the same as it was for Stage I. However, the sources of the pressures which effected that configuration are, as explained, different for Stage IV than it was for Stage I. Under the operating conditions for Stage IV, however, the desideratum is to dump the hydraulic fluid in a manner which assures that the pressure of the fluid within the torque converter 14 is minimized, thereby lowering the ability of the impeller to transfer torque to the turbine. Therefore, the valve opening pressure is provided at the subchamber 64D rather than via the conduit 98. The pressure in conduit 98 is reduced to a level sufficient to move hydraulic fluid through the cooler 118. Stage IV operation achieves that result.

As should now be apparent, the present invention provides a regulator valve assembly that not only serves to assure that the pressure of the hydraulic fluid within a torque converter is maintained at the desired minimum pressure during operation of the torque converter, but also that the other objects of the invention can likewise be accomplished.

The embodiments of the invention in which an exclusive property or privilege is claimed are defined as follows:

1. A regulator valve assembly in combination with a torque converter and a vehicular transmission, the transmission having a hydraulic system, a pump means for providing pressurized hydraulic fluid to a distribution system within in transmission, a cooling system and a torque converter, said regulator valve assembly comprising:

a housing;
   a valve chamber within said housing;
   a first inlet port communicating with said valve chamber through said housing and adapted for communicating with the pressurized hydraulic distribution system within the transmission;
   a first outlet port communicating with said valve chamber through said housing and adapted for communication with the inlet of the pump means which provides pressurized hydraulic fluid to the transmission hydraulic control system;
   a second outlet port communicating with said valve chamber through said housing and adapted for communicating with the inlet of the torque converter;
   a second inlet port communicating with said valve chamber through said housing and adapted for communicating with the outlet of the torque converter;
   a third outlet port communicating with said valve chamber through said housing and adapted for communicating with the inlet of the transmission cooling means; and
   a valve member axially translatable with said housing to effect selective simultaneous direct communication between said first inlet and said first and second outlet ports.

2. A regulator valve assembly as set forth in claim 1, wherein:
   said valve member effects a continuous communication between said first inlet and said second outlet ports.

3. A regulator valve assembly as set forth in claim 1, wherein:
   said valve member effects selective communication between said first inlet port and said first, second and third outlet ports.

4. A regulator valve assembly as set forth in claim 1, wherein:
   said valve member effects selective communication between said first inlet port and said first and third outlet ports.

5. A regulator valve assembly as set forth in claim 1, wherein:
   said valve member effects selective communication between said second inlet port and said third outlet ports.

6. A regulator valve assembly in combination with a torque converter and a vehicular transmission, the transmission having a hydraulic system, a pump means for providing pressurized hydraulic fluid to a distribution system within the transmission, a cooling system and a torque converter, said regulator valve assembly comprising:

a housing;

a valve chamber within said housing;

a valve member axially translatable with said chamber;

said valve member defining at least first, second and third subchambers within said valve chamber;

axial translation of said valve member effecting selective communication between said subchambers;

a first land interposed between said first and second subchambers;

a second land interposed between said second and third subchambers;

a first outlet communicating with said first subchamber and a low pressure region in communication with said pump means;

a first inlet and a second outlet continuously communicating with said second subchamber;

a third outlet communicating with said third subchamber;

selective translation of said valve member effecting direct communication between at least said first inlet and said first and third subchambers.

7. A regulator valve assembly as set forth in claim 6, wherein:

further translation of said valve member effects communication between said first and second subchambers as well as between said second and third subchambers.

8. A regulator valve assembly as set forth in claim 7, wherein:

said first land exposes a projected area to said second subchamber that is less than the projected area said second land exposes to said second subchamber.

9. A regulator valve assembly as set forth in claim 8, further comprising:

a fourth subchamber;

a third land interposed between said third and fourth subchambers;

a fourth land exposed to said fourth subchamber;

a third inlet port communicating with said fourth subchamber;

means selectively to supply pressurized hydraulic fluid to said fourth subchamber through said third inlet port.

10. A regulator valve assembly as set forth in claim 8, further comprising:

spring means to bias said spool valve member such that said first land precludes communication between said first and second subchambers.

11. A regulator valve assembly as set forth in claim 6, further comprising:

a converter control valve interposed between said regulator valve assembly and the torque converter;

means in said converter control valve to direct hydraulic fluid from said second subchamber selectively to either the torque converter or said third subchamber.

12. A regulator valve assembly as set forth in claim 11, wherein:

said converter control valve has first and second inlet ports and first and second outlet ports;

said first inlet port and said second outlet port in said converter control valve communicating respectively with said second and third subchambers; and said first outlet port and said second inlet port communicating respectively with an inlet to and an outlet from the torque converter.

13. A regulator valve assembly in combination with a torque converter and a vehicular transmission, the transmission having a hydraulic system, a pump means for providing pressurized hydraulic fluid to a distribution system within the transmission, a cooling system and a torque converter, said regulator valve assembly comprising:

a housing;

a valve chamber within said housing;

a first inlet port communicating with said valve chamber through said housing and adapted for communicating with the pressurized hydraulic distribution system within the transmission;

a first outlet port communicating with said valve chamber through said housing and adapted for communication with the inlet of the pump means which provides pressurized hydraulic fluid to the transmission hydraulic control system;

a second outlet port communicating with said valve chamber through said housing and adapted for communicating with the inlet of the torque converter;

a second inlet port communicating with said valve chamber through said housing and adapted for communicating with the outlet of the torque converter;

a third outlet port communicating with said valve chamber through said housing and adapted for communicating with the inlet of the transmission cooling means;

a valve member axially translatable with said housing to effect selective communication between said ports;

a knockdown chamber;

a third inlet port; and said third inlet port communicating with said knockdown chamber.

14. A regulator valve assembly as set forth in claim 13, further comprising:

said valve member effects selective communication between said first inlet port and said first, second and third outlet ports;

said valve member effects selective communication between said second inlet port and said third outlet ports.

* * * * *